(12) United States Patent
Cleary et al.

(10) Patent No.: US 7,953,580 B2
(45) Date of Patent: May 31, 2011

(54) METHOD AND A SYSTEM RELATING TO NETWORK MANAGEMENT

(75) Inventors: David Cleary, Athlone (IE); Boris Danev, Zurich (CH)

(73) Assignee: Ericsson AB, Stockholm (SE)

( * ) Notice: Subject to any disclaimer, the term of this patent is extended or adjusted under 35 U.S.C. 154(b) by 384 days.

(21) Appl. No.: 12/096,265

(22) PCT Filed: Dec. 5, 2005

(86) PCT No.: PCT/EP2005/056490
§ 371 (c)(1),
(2), (4) Date: Jul. 9, 2008

(87) PCT Pub. No.: WO2007/065471
PCT Pub. Date: Jun. 14, 2007

(65) Prior Publication Data
US 2008/0294418 A1    Nov. 27, 2008

(51) Int. Cl.
*G06F 17/50* (2006.01)
*G06F 9/445* (2006.01)
*G06F 15/173* (2006.01)

(52) U.S. Cl. .......... 703/2; 703/22; 703/24; 709/218; 709/227; 709/249; 370/254

(58) Field of Classification Search .......... 703/2, 5–7, 703/22, 24; 709/218, 227, 249; 370/254
See application file for complete search history.

(56) References Cited

U.S. PATENT DOCUMENTS

| | | | |
|---|---|---|---|
| 6,058,103 | A | 5/2000 | Henderson et al. |
| 2002/0103890 | A1 | 8/2002 | Chaudhuri et al. |
| 2005/0216881 | A1 | 9/2005 | Sankaran et al. |

*Primary Examiner* — Thai Phan
(74) *Attorney, Agent, or Firm* — Coats & Bennett, P.L.L.C.

(57) ABSTRACT

The present invention relates to a method for network management comprising configuration of control protocols between network elements in a network represented through a current, static, network element object model comprising a number of managed objects with attributes and instances and representing resources. It comprises the steps of: transforming the current network element object model to a machine readable and executable formal network element object model; identifying configuration tasks needed for the configuration of the relevant control protocols; modelling a formal configuration task model using information about the configuration tasks and the formal network element object model; building a formal configuration workflow model using the formal network element object model and the formal configuration task model, said formal configuration workflow model defining the relationships between different configuration tasks required for performing or completing a number of given actions or to achieve a number of given goals.

25 Claims, 6 Drawing Sheets

METHOD AND A SYSTEM RELATING TO NETWORK MANAGEMENT

FIELD OF THE INVENTION

The present invention relates to a method for network management comprising configuration of control protocols between network elements in a network represented trough a current, static, network element managed object model comprising a number of managed objects.

The invention also relates to a system for network management comprising means for configuration of network element control protocols, for example control protocols between network elements in a network represented through a current, static, network element managed object model comprising a number of managed objects.

STATE OF THE ART

Within the network management field much effort has been made to create rule based approaches to automate different tasks in network elements. These approaches focus on the notion of a policy. A policy is a set of considerations designed to guide decisions of courses of action. It is an event-triggered condition-action rule that can be used to define adaptable management actions. An example of such management action is change of Quality of Service (QoS). Policy-based systems use policies to derive appropriate actions. A typical policy-based network management system uses a rule engine to process all policies, eliminate conflicts, propose an appropriate policy and enforce it in the network elements. Policy-based systems particularly concentrate on how to use knowledge to solve practical problems, with little emphasis on the actual representation of the knowledge concepts.

The ability to represent knowledge has evolved from earlier approaches of expert systems to knowledge engineering. Ontological engineering focuses on only how to capture concepts in a given domain with the purpose of sharing a common understanding of the domain in question and enable interoperability and knowledge reuse. Ontology development has received interest with the so called Semantic web initiative and has triggered development of new languages and processing tools for capturing and representing knowledge, allowing research companies to the re-examine the concept of using ontologies as a possible solution to solve problems related to reuse and sharing of information. Ontologies, similar to policy-based approaches, also use rules but only to describe knowledge concepts and to explain relationships between concepts and concept attributes. Rules in ontologies are hence not event-triggered condition-action rules since they do not trigger any events or actions.

It is known to perform configuration management of control protocols in Radio Access Networks following well-defined processes. Network configuration or reconfiguration is planned offline in a planning phase based on some external event such as adding new equipment, distributing traffic load, etc. Then engineers, for example within the customer support, perform the planned configuration/reconfiguration by following the appropriate configuration task specification, which basically consists of steps to be executed in a well-defined order.

Performing a configuration or reconfiguration task on network elements can for example be achieved by using a command-line interface (CLI) or a machine interface (CORBA). The former consists of performing an operation and maintenance activity by issuing commands to the network element. Such commands are often structured in scripts and sometimes graphically user interfaces are provided to collect configuration input and populate the scripts with the configuration information to be enforced in the network. The latter approach uses a machine interface, e.g. CORBA, by the mediation of a Graphical User Interface enabled application. Such applications manipulate a high-level object-oriented abstraction of network device resources represented by a Managed Object Model. The application also implements the logic of the configuration task in some programming language. Using these applications, a customer support engineer first provides the necessary configuration input, collected during the planning phase. Validation is then performed by a separate application to ensure that the input respects particular constraints related to the configuration task. After validation, the application uses the machine interface to push the programmed configuration in the network.

A solution based on using purpose-built command-line configuration scripts for configuration/reconfigurations requires a lot of human interaction to create or modify scripts. It requires a careful reading of the configuration task specification and a correct interpretation of the various configuration steps and constraints. Such a solution is also extremely prone to errors because scripts do not usually offer any validation to assert that the input configuration data is consistent. Furthermore, it is very difficult to reuse scripts because knowledge about given configuration tasks is hard-coded in the scripting language that is used. Graphical user interfaces for creating or modifying the scripts only provide user friendly human-script interaction. They do however not solve any of the other problems referred to above.

The building of configuration applications using machine readable (CORBA) interfaces and the Managed Object Model for configuration management provides a more robust configuration interface to achieve less error prone configurations. However, in known Managed Object Models there is little or no semantic information about the Managed Objects and their relationships, which increases the burden of building application logic for handling network domain assumptions and specific configuration task constraints. Even with a very good software design, knowledge about the domain and configuration coded in one application cannot be shared or reused across other applications.

Configuration management tasks are particularly hard to perform in e.g. 3G networks, e.g. 3G wireless radio access networks and they were so far not automated to any considerable or satisfactory extent. This is mainly due to the fact that such networks are highly dynamic in their nature. Furthermore the information model to be manipulated is very large in size and the interactions related to transport signalling, redundancy and mobility are very complex. In addition thereto the control protocols used are very complex.

SUMMARY OF THE INVENTION

What is needed is therefore a method as initially referred to through which the amount of human interaction can be reduced particularly in dynamic networks with a high degree of complexity. A method is also needed which is not prone to errors. Particularly a method is needed which facilitates configuration of control protocols between network elements in a 3G network e.g. a RAN. A method is also needed which provides a robust configuration in the phase. Moreover a method is needed for which the requirements such as careful reading of for example configuration task specifications and interpretation of their configuration steps and constraints can be minimized or reduced. Still further a method is needed which enables validation in run-time in order to assure that the input configuration data is consistent. A method is also needed which does not require a complicated building of application logic to handle network domain assumptions and specific configuration task, constraints. More particularly a method is needed which allows sharing and reusing of knowledge about domain and/or configuration coded in one application by other applications.

Even more particularly method is needed which allows for validation of configuration at run-time and through which errors and mis-configurations, particularly due to human intervention, can be caught quickly and efficiently and appropriately corrected.

Also a system is needed through which one or more of the above mentioned objects can be fulfilled.

It is particularly an object of the present to provide a new modelling approach based on ontologies. Ontologies are taxonomies of concepts and their attributes in a given domain together with a formal representation of domain assumptions. Formal here means that it is semantically rich and based on a well-understood logical paradigm that is machine readable and executable. Therefore a method as initially referred to is provided which comprises the steps of;
transforming the current network element managed object model to a machine readable and executable formal network element managed object model;
identifying configuration tasks needed for the configuration of the relevant control protocols;
modelling a formal configuration task model using information about the protocol configuration task and the formal network element managed objects model;
building a formal configuration workflow model using the formal network element managed object model and the formal configuration task model, whereby said formal configuration workflow model defines relationships between different configuration tasks required for performing or completing a number of given actions or to achieve a number given goals, e.g. configuration actions.

Particularly the transforming step and the modelling step comprise; forming formal ontologies representing the current network element managed object model, i.e. comprising a formal network element managed object model, and the configuration task model, i.e. the formal configuration task model respectively. Particularly the transforming step comprises; enriching the current network element managed object model by adding formal semantics and formal domain assumptions thereto.

Even more particularly the enrichment step comprises; making concepts, or explicit meanings, of the managed objects of the current network element managed object model using frame logic primitives for representation of managed object sub-classes, containments and association relationships. Most particularly the formal domain assumptions comprise domain constraints, for example cardinality constraints, but also other domain constraints. Advantageously, the method additionally comprises the step of; fetching the domain assumptions or domain constraints in specifications specifying the managed objects contained in the current network element managed object model, and adding said constraints using frame logic.

Advantageously the transforming step comprises; using frame logic to formally model managed object classes, attributes and relationships. The used frame logic most particularly comprises the so called F-logic and the transforming step comprises; mapping an UML Managed Object Model to F-logic, and; modelling constraints using F-logic rules.

Ontologies in F-logic are for example described in the document with the same name by J. Angele and G. Lausen, Ontoprise GmbH, Universität Freiburg. The "F" in F-logic stands for frame and combines the advantages of conceptual high-level approaches typical for frame-based languages and the expressiveness, the compact syntax and the well defined semantics from logics. The features of F-logic include signatures, object identity, complex objects, methods, classes, inheritance and rules. In the above mentioned document an overview of the syntax and the intuitive semantics of F-logic is given. Ontology, or conceptual modelling, deals with describing, in a declarative and abstract way, the domain information of an application, its relevant vocabulary and how to constrain the use of the data, by understanding what can be drawn from it.

In a preferred embodiment the modelling step comprises; creating formal configuration ontologies of different tasks needed for the, or a number of, configuration tasks for control protocols using frame logic.

Most particularly the modelling step comprises; establishing relationships between protocol configuration tasks and the formal representation of the managed objects of the formal network element managed object model using ontology concepts. Most particularly the configuration tasks comprise one or more of; adding a network element, replacing a network element, removing a network element, and preparenting a network element etc. (Of course it may also concern actions on more than one network element.) In several embodiments a configuration task comprises a number of sub-tasks and the configuration task or tasks and the sub-tasks are represented by ontologies.

The building step particularly comprises using frame logic primitives to provide the respective workflow. Most particularly the method comprises step of; introducing external information to provide the formal configuration workflow model, for example manually or automatically, from tables, manuals etc. The workflow model particularly provides the configuration task, with possible sub-tasks, order for carrying out a number of different configuration task actions and provisioning of relevant data to respective tasks and propagation of relevant data between configuration tasks and/or sub-tasks. Most particularly the real data from the network is input to provide relationships between configuration tasks and/or sub-tasks. Most particularly the method comprises the step of using frame logic axioms to build the configuration workflows. Even more particularly the method comprises the further step of executing the formal configuration workflows with network elements' data, to obtain semi-automatic configuration of the control protocols to be configured. Said executing step may comprise using an inference engine to execute the relevant workflows.

Most particularly the method comprises the steps of; loading the formal network element managed object model, the formal configuration task model and the relevant configuration workflow ontology for a particular configuration task comprising a plurality of configuration tasks and/or sub-tasks into a database;
requesting a representation of network data from the network to be configured;
converting the representation of the network data to ontology instances;
providing a connection to the database via an inference engine API (Application Programming Interface), hence providing a user interface;
manually performing the automatical configuration task via the user interface;
converting from the configuration resulting ontology instances to configuration network data;

introducing the configured network data into the network hence obtaining a configured or reconfigured network, network element or control protocols.

Most particularly the network to be configured or in which control protocols are to be configured, comprises a Radio Access Network, RAN, which most particularly be a 3G RAN, such as for example a WCDMA RAN, a UTRAN, a GERAN, a CDMA 2000 RAN etc.

Most particularly current network element managed object model comprises an Operation and Maintenance model. The representation of network data may comprise an XML, e.g. a Bulk CM XML, representation of network data.

In order to solve one or more of the problems referred to earlier in the application, and to fulfill one or more of the objects discussed above, a system as initially referred to is also provided which comprises transforming means which are adapted to transform the current network element managed object model to a machine readable and executable formal network element object model, identifying means for identifying configuration tasks needed for configuration of at least a number of control protocols, e.g. from a configuration specification or other sources, and modelling means for modelling a formal configuration task model which are adapted to use information in the formal network element managed object model and information about the information tasks. The system further comprises flow building means for building a formal configuration workflow model using the formal network element managed object model and the formal configuration task model as well as external information or internal information, which formal workflow configuration model defines the relationships between different tasks required for performing or completing a number of actions.

The transforming means and the modelling means particularly comprise means for forming ontologies representing the current network managed object model and the configuration task model, hence forming the formal network element managed object model and the formal configuration task model respectively.

Particularly the transforming means are adapted to enrich the current network element managed object model by adding formal semantics and formal domain assumptions. Still further the enrichment means preferably are adapted to make concepts, or explicit meanings, of the managed objects of the current network element managed object model by means of frame logic primitives for representation of managed object sub-classes, containments and association relationships. More particularly, the workflow building means comprise or are adapted to collect dedicated or external knowledge to provide workflows. The formal configuration workflows will then be adapted to, automatically, collect data required for workflows and distribute data to other configuration tasks, when needed. Advantageously the system comprises a database adapted for loading into it the formal network element managed object model, the formal configuration task model and the relevant workflow ontology for a particular configuration task comprising a plurality of configuration tasks and/or sub-tasks and means for requesting or at least receiving, a representation of a network data from the network to be configured, means for converting the representation of the network data to ontology instances. Particularly it comprises means for connecting to the database or providing a connection to the database via an inference engine API (Application Program Interface) to provide a user interface through which the automatical configuration task can be manually initiated or supported and, further, means for introducing reconfigured network data into the network, hence obtaining a configured or reconfigured network. Particularly the network comprises a Radio Access Network, most particularly a 3G Radio Access Network such as a WCDMA RAN, and the current network element managed object model comprises an Operation and Maintenance model. Even more particularly the representation of network data comprises an XML, particularly a BULK CM XML representation of network data. Reference is in this context made to 3GPP TS 32.615, v.5.5.1 (2004-12) and 3GPP TS 32.612 "Telecommunication management; Configuration Management (CM); Bulk CM Integration Reference Point (IPR): Information Service (IS)", where the concepts are explained. The copending patent application "A METHOD AND A SYSTEM FOR NETWORK MANAGEMENT INFORMATION REPRESENTATION" filed on the same date and by the same applicant describes provisioning of semantic external interfaces for Network Management System.

BRIEF DESCRIPTION OF THE DRAWINGS

The invention will in the following be further described, in a non-limiting manner, with reference to the accompanying drawings, in which.

DETAILED DESCRIPTION OF THE INVENTION

Figure 1:
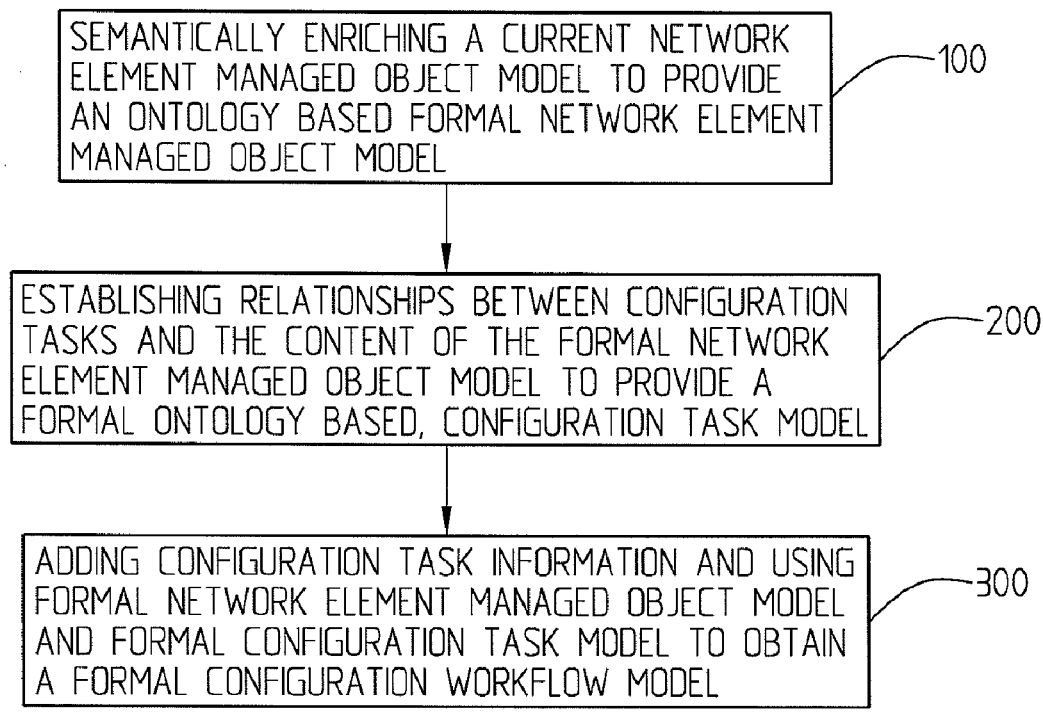
FIG. 1 is a schematical flow diagram describing an overview of the basic steps of a procedure according to the present invention.

The present invention particularly deals with the field of configuration management (CM) which is an area wherein much time is spent on optimizing and changing the network to increase the revenue. It is important to be able to reduce the costs, which, according to the present invention, can be provided for by means of configuration management automation. Configuration management is particularly used for setting up, controlling modifying communication traffic in network devices and network elements, for example devices such as switches, routers, base stations etc. It includes node configuration, software management, information model and logical connection management for initial system installation to establish the network, system operation to adapt the system to short term requirements, system update to overcome bugs or equipment faults and system upgrade to enhance or extend the network. Although configuration management tasks have achieved a considerable level of automation in the IP world, the situation is not the same for 3G networks, particularly 3G wireless radio access networks. Such networks are particularly difficult to configure or reconfigure due to their highly dynamic nature, the size of the information model to be manipulated, the complex interactions related to transport, signaling, redundancy and mobility and due to the complexity of the protocols used. For example WCDMA networks are flexible entities that change often to adapt to new situations such as changing traffic load, load distribution etc. Such changes have a strong dependency relationship with the external environment and these dependencies make automation extremely difficult and generally in such activities require precise expert human knowledge and careful advanced planning.

According to the invention ontologies are considered to provide a potential to solve challenging problems in configuration management, creating richer data models of network and allowing more automation among others for detection of bad configurations.

The term ontology in this document is defined as an explicit specification of a conceptualization. As such ontology means a hierarchy of organized concepts in some abstract domain, relations between them and axioms to formalize the definitions and relations. An ontology as an explicit specification must also rely on well-understood formal semantics, which can be processed by machines.

Through the use of ontologies reuse and machine execution and analyses of knowledge can be provided. Various ontology description languages are known, for example OWL (Ontology Web language). The ontology definition language constructs are according to the present invention preferably translated to Frame logic (F-logic) that can be used to represent knowledge of a domain in a structured and formally well-understood way. In a particularly advantageous implementation a commercial available F-logic based language by the company Ontoprise® is used as well as their inference engine, by Ontobroker, to be more thoroughly described below. Of course other and similar F-logic based languages and interference engines can be used as well, this merely representing an advantageous implementation.

The present invention will particularly be described with reference to configurations relating to wireless networks. Due to the dynamic nature of wireless networks the management involves constant operator monitoring and frequent customization of network resources. Network resource data is structured in complex information models, which generally are based on a set of object-oriented models raising the abstraction from physical resources to a higher level of abstraction that can be used by software management applications.

In the context of the WCDMA radio network, the hardware resource data model is available to management applications as a Managed Object Model (MOM) which is part of the management adaptation layer, a higher-level abstraction of the resource layer, usually stored in relational databases. The MOM comprises a number of managed objects, MOs, which are abstractions of managed entities such as hardware resources, mobile cells or communication channels. A manager controls an entity by creating, deleting and modifying MOs that represent that particular entity. The naming mechanisms of managed objects consist of relative distinguished name (RDN), local distinguished name (LDN) and fully distinguished name (FDN). Each network element (NE) stores instances of MOs in a managed information base (MIB). The relations and cardinalities of the MO instances are based on the MOM conceptual specification. MIB manipulation is based on the TMNs manager agent paradigm where CM applications (managers) control the NE MIB (agent) by creating, modifying and deleting instance objects.

The present invention suggests a MOM modelling approach based on ontologies, which are taxonomies of concepts and their attributes in a given domain together with formal representation of domain assumptions. Formal, as referred to above, in this document means that it is semantically rich and based on a well-understood logical paradigm. Formal ontologies are hence based on well-defined semantics enabling machine readability and reasoning about information. Generally the present invention provides a combination of modelling a network element information model (MOM) in both sides of a controlling link and modelling of configuration tasks for controlling protocols as formal ontologies by adding semantic and formal domain assumptions. The interaction between both these formal ontologies enables a smart network configuration which includes automatic suggestion of configuration information depending on the configuration context as well as it allows for run-time validation of the configuration process to ensure that configuration operations respect the formal representation of the configuration knowledge. In particularly the invention suggest a process or a set of architecture steps resulting in a new machine-to-machine interface which facilitates semi-automatic protocol configuration.

FIG. 1 is a simple flow diagram schematically illustrating the basic steps of the method according to the present invention. In a first step, 100, the method comprises semantically enriching a current network element managed object model to provide an ontology based formal network element managed object model. In the subsequent step, relationships between configuration tasks and the content of the formal network element managed object model are established to provide a formal ontology based configuration task model, 200. Subsequently configuration task information is added, for example via a network expert, manually or partly manually, or more or less automatically using tables or similar, and the formal network element managed object model and the formal configuration task model are used with the said configuration task information in order to provide a formal configuration workflow model, 300. These steps will be more thoroughly explained with reference to FIGS. 2, 3, 4 below.

Figure 2:
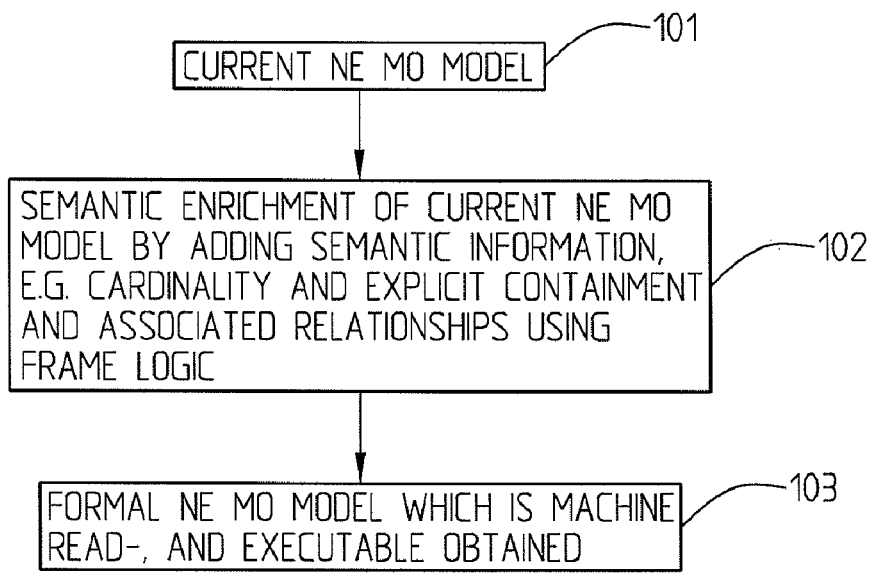
FIG. 2 is a simplified partial flow diagram describing the first step of transforming a current network element managed object model to a formal network element managed object model.

FIG. 2 shows in some more detail the first step 100 discussed above. Hence it is supposed that a current network element managed object (current NE MO) model is available, 101. The current NE MO model is then semantically enriched for example via a network expert, at least partly manually, through adding semantic information, for example cardinality and explicit containment and association relationships using frame logic, 102. Thus, the current NE MO model is enriched with formal semantics and formal domain and expert assumptions using frame logic, which can be achieved by making explicit the meaning of the managed objects of the network element using frame logic primitives for representing sub-class, containments and association relationships. Then domain assumptions, such as cardinality constraints and other domain constraints available in a specification of the MOs are added by means of frame logic axioms to achieve a formal NE MO model, 103 which is machine read-, and executable.

In an advantageous implementation a formal NE MO model is created by explicating a UML (Unified Modelling Language) managed object model using F-logic which means formally modelling classes, attributes and relationships using frame logic as explained below which exemplifies UML MO mapping to F-logic: Managed Element is a top level Managed Object which has its own attributes and relationships to other concepts such as IpSystem and TransportNetwork together with their associated cardinality constraints.

```
#ManagedElement[#logicalName=>xsd#STRING;
#hasIpSystem => #IpSystem;
    #mincard@(hasIpSystem) -> 1;
    #maxcard@(hasIpSystem) -> 1;
#hasTransportNetwork => #TransportNetwork;
    #mincard@(hasTransportNetwork) -> 1;
    #maxcard@(hasTransportNetwork) -> 1;
.
..
].
```

Domain and expert constraints are added to provide an enriched formal model and these constraints are modelled using F-logic rules. Below a radio network constraint (a formal domain assumption) is exemplified comprising the rules simply saying that it is impossible to have two radio base stations with the same identity in a sub-network if a sub-network context is assumed:

```
FORALL S check(S) <- EXISTS R1,R2,V1,V2
R1::#BaseStation[#id -> V1] and R2::#BaseStation[#id ->
V2] and equal(V1,V2) and S is "We can not have two
BaseStations with same identity".
```

Figure 3:
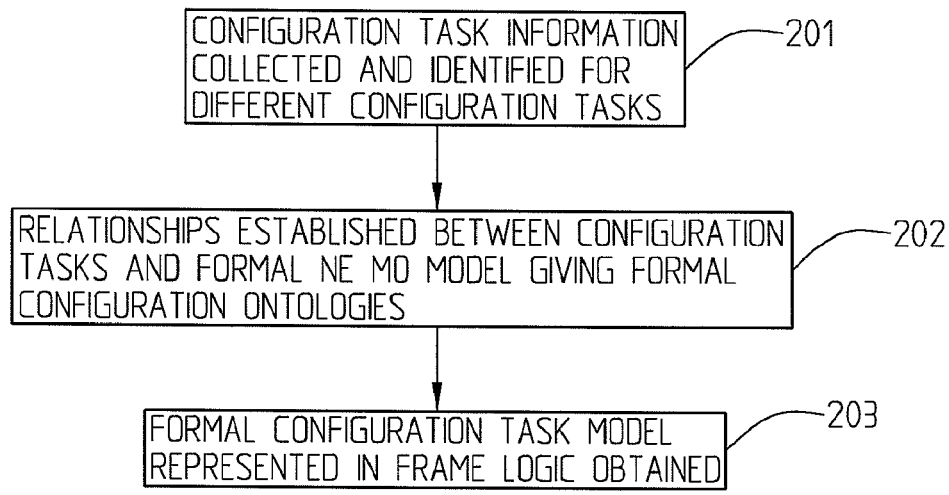
FIG. 3 is a simplified diagram describing the second step comprising the forming of a formal configuration task model, FIG. 4 schematically illustrates the forming of a configuration workflow model according to the present invention.

FIG. 3 is a schematical flow diagram illustrating in some more detail the second step of FIG. 1. It is hence supposed that configuration task information is collected and identified for a number of different configuration tasks, 201. This means that knowledge about different configuration tasks is identified for example in a configuration specification. Preferably assistance is provided by a network expert about configuration alternatives for different tasks to allow for a configuration of control protocols using frame logic, 202. Thereby formal configuration task model represented in frame logic is obtained, 203. Thus, this step is based on a reuse of the concept of the formal NE MO model obtained in the first step to bind configuration knowledge to a network element information model. These relationships comprise relationships between configuration tasks and managed objects.

Subsequently the third step of FIG. 1 is more thoroughly described with the reference to FIG. 4. It is supposed that configuration information relating to different configuration tasks is provided, for example by a network expert, 301. Relationships are then created between configuration tasks, independent configuration tasks, dependent configuration tasks, sub-tasks, using frame logic primitives of the formal NE MO model and the formal configuration task model, 302. This gives a formal configuration workflow model, 303.

Thus, based on the available configuration specifications and other information, for example expert knowledge of the general attributes of the network, formal configuration workflows are built. They are made consistent within the configuration context by means of frame logic axioms and are based on formal representations as discussed above, the NE MO formal model and the formal configuration task model. The final configuration workflows are attached to relevant network elements to achieve a semi-automatic configuration of control protocols. Each formal configuration workflow collects relevant data and distributes relevant data to other workflows and/or sub-flows for performing a given configuration task, 304. This means that the formal configuration workflows take care of collecting data needed for a given configuration task and propagating it to other configuration tasks when needed. It further prevents insertion of erroneous values in tasks participating in the workflow. The general step can be said to consist in constituting and creating relationships between tasks needed to perform a particular action or to fulfil a particular goal expressed in a formal machine read- and executable manner.

This model needs to be instantiated, which will be explained with reference to a particular implementation later on.

The third step described will now be more thoroughly explained with reference to FIG. 4 and by means of reference to an implementation example concerning the configuration tasks for building RNC (Radio Network Controller) signalling links for NBAP Common (Node B Application Protocol) in the part of the configuration of the Iub interface between a Radio Network Controller RNC and a radio base station RBS. In Table 1 shown below Iub link MO configuration is illustrated.

TABLE 1

| Pos. | MO:<Type>=<name><br>Parent:<Type>=<name> | <attribute>=<value> | Comment |
|---|---|---|---|
| 1 | MO:<br>IubLink=Iub_<rbsname>*<br>Parent:RncFunction=<br>1*) rbsname= user<br>defined name of<br>the RBS, the same<br>name as used for<br>MeContextId for the<br>RBS. | rbsId=<rbsid><br><br><br><br>rncModuleRef=<br><MOref> | Integer representing the RBS identity. Has to be unique at least within the RNC. Reference to RncModule MO representing RNC processing resources for the Iub connection. |

Table 2 shows a RNC signalling links for NBAP-C to RBS, though the positions indicate the order for doing the task.

TABLE 2

| Pos. | MO:<Type>=<name><br>Parent:<Type>=<name> | <attribute>=<value> | Comment |
|---|---|---|---|
| 1 | MO: AtmTrafficDescriptor=<br>U3P<pcr>M<mcr><br>Parent:<br>TransportNetwork=1 | ingressAtm-<br>Pcr=<pcr><br>egressAtmPcr=<pcr><br>ingressAtmMcr=<<br>mcr><br>egressAtmMcr=<<br>mcr><br>ingressAtmQos=<br>CLASS_THREE<br>egressAtmQos=<br>CLASS_THREE<br>serviceCategory=<br>UBR+ | ATM traffic descriptor for SAAL-UNI signaling links for NBAP-C at Iub. See formal description DB |

TABLE 2-continued

| Pos. | MO:<Type>=<name><br>Parent:<Type>=<name> | <attribute>=<value> | Comment |
|---|---|---|---|
| 2 | MO: VclTp=vc36<br>Parent: . . ., VpcTp<br>(Pos. 3 in table 58. | externalVci=36<br><br>atmTrafficDescriptorId=<br><MOref> | Signaling link for<br>NBAP-C to RBS.<br>Reference to MO in<br>Pos. 1 |
| 3 | MO: Aal5TpVccTp=b<rbsid>ca<br>Parent:<br>TransportNetwork=1 | processorId=<<br>MOref><br><br>vclTpId= <MOref><br><br>fromUserMaxSdu-<br>Size=2048<br>toUserMaxSdu-<br>Size=2048 | Reference to<br>PlugInUnit for active<br>MP in RNC module x<br>Reference to MO in<br>Pos. 2. |
| 4 | MO: UniSaalProfile=win<w><br>Parent:<br>TransportNetwork=1 | See profile for<br>"win<w>" in table<br>18. | W= 30 or 60.<br>See recommended<br>profiles for SAAL-UNI<br>signalling link for<br>NBAP-C. |
| 5 | MO:<br>UniSaalTp=b<rbsid><br>ca<br>Parent:<br>TransportNetwork=1 | uniSaalProfileId=<<br>MOref><br>aal5TpVccTpId=<br><MOref><br>MaxSduSize=2044 | Reference to MO in<br>Pos. 4.<br>Reference to MO in<br>Pos. 3. |
| 6 | MO: NbapCommon=1<br>Parent: . . . , IubLink | activeUnisaalTp=<<br>MOref><br><br>standbyUniSaalTp=<br><MOref> | Reference to<br>MO in Pos. 5,<br>corresponding to<br>first link<br>Reference to MO for<br>standby signalling<br>link<br>corresponding to<br>second link. |

The configuration task ontology has to be augmented with two types of F-logic axioms in order to create a consistent formal (machine-readable) configuration model from the specification above:
1. Inferring configuration values: Rules that infer the values of configuration task attributes from the configuration context

```
FORALL T,V1 T[egressAtmPcr -> V1] <- EXISTS
RBS,RNC,Q reparent(RBS,RNC,T) and
T:AtmTrafficDescTask
and
RBS.hasTransportNetwork[hasAtmTrafficDescriptor -
>> Q] and
Q[trans#egressAtmPcr -> V1].
```

In a Reparent RBS configuration context between a given RBS and RNC, the values of the ATM traffic descriptor for the RNC are implied by the values of the ATM traffic descriptor available in the RBS.
2. Connect workflow tasks to ensure consistency: Rules that propagate data from one task to other tasks of the workflow in order to ensure consistency of the configuration workflow. Configuration data in many tasks in the configuration process refer to data available in other tasks in the workflow.

```
FORALL T1,T2,ATMTD T2[atmTrafficDescriptorLink ->
ATMTD] <-
T1:AtmTrafficDescTask[atmTrafficDescriptorOb ->
ATMTD;
post ->> T2:TransportTask].
```

The above rule propagates the AtmTrafficDescriptor information available in the AtmTrafficDescriptor task to the Transport task, which needs the ATM information for its own consistent configuration.

Figure 5:
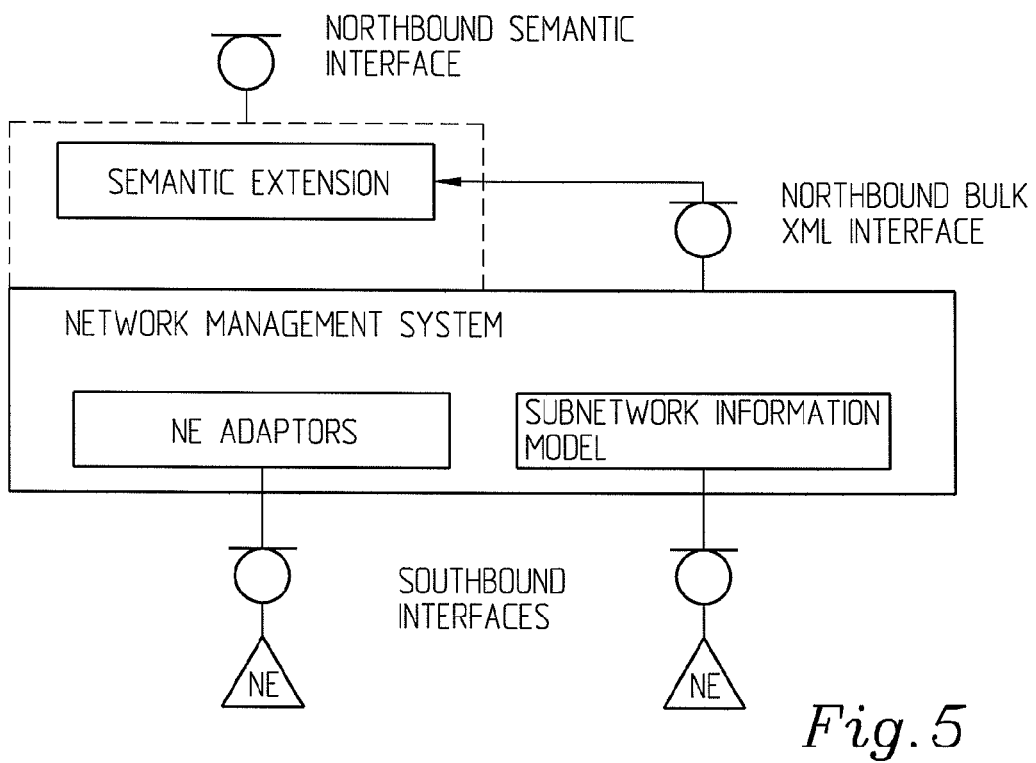
FIG. 5 illustrates how a semantic extension of a Northbound interface could be provided.

FIG. 5 schematically illustrates a semantic Northbound interface. (The concept Northbound (external, i.e. for being used by third party network management software vendors) is e.g. explained in the 3GPP TS specifications referred to earlier in this document.) Architecturally however the semantic extension in FIG. 5 should ideally be inside the NMS to directly provide a semantically rich configuration-aware Northbound interface. In the present invention, for reasons of simplicity, the implementation of the inventive concept may be done on top of an existent NMS Northbound Bulk XML interface while achieving same effect. (Southbound interfaces relates to "internal" interfaces, i.e. between the network management system and the network elements.)

Figure 6:
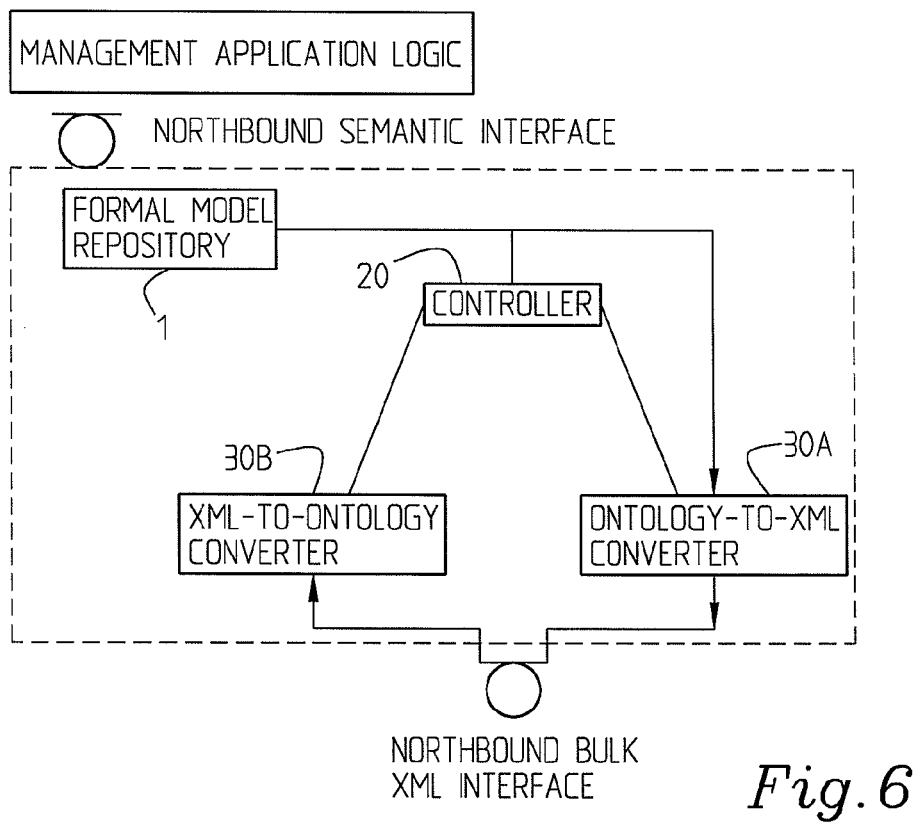
FIG. 6 shows a preferred implementation of a semantic extension architecture according to the invention.

FIG. 6 schematically illustrates one approach according to the inventive concept to build a semantic extension. 3GPP, TS 32.611: "Bulk CM Integration Reference Point (IRP)" provides an XML representation of configuration data for use in network management applications. The provided XML configuration data is used to build instances of the formal ontologies representing the network using XML-to-ontology converter 30B, of controller 20. They are stored in a database, formal model repository 1. Then ontologies and instances capturing configuration knowledge in the repository are manually added. Then the network model stored in the formal model repository 1 have been enriched and it is now possible from management applications to query and modify the enriched model. This can be achieved through interaction with an inference engine (not shown in this figure). After any modification, the inference engine performs validation and consistency checking. At the end, the new configuration is converted back to XML for network deployment using the ontology to XML converter 30A over the Northbound Bulk XML interface. The function of the controller 20 is to convert between various XML and ontology instances and it also contains the inference engine to reason over the formal model repository 1. Advantageously the formal representation of network models according to the present invention is based on current standard ontologies to facilitate model reuse, sharing and exchange as a key to solve interoperability problems. The ontologies also capture configuration task models and hence incorporate expert configuration knowledge into the configuration model.

In order to provide the formal configuration model, knowledge about configuration tasks in here, the wireless network, is introduced, which basically includes tasks common to all network elements in for example a RAN such as UTRAN, for example transport related tasks. Preferably it is distinguished between high-level configuration tasks and low-level configuration tasks. In a RAN, high-level configuration tasks are for example adding a new network element and high-level tasks are accomplished by the execution of a number of low-level tasks, which create or update particular managed objects. Each low-level task is responsible for storing configuration data and assuring that this data is consistent with the configuration context in which the task participates. Generally there are three different sources a task may use to get information for its configuration. The first source is user supplied information, which normally comes from detailed planning of the configuration task and hence cannot be automated and normally a human user supplies specific information and the task can only validate or reject the user input. A second source relates to information that could be inferred from the configuration context; such information is derived from well-established business contracts between network elements taking part in the configuration. This means that the user does not have to find information needed to complete the task. The third source may comprise information coming from other previously configured or future tasks in the configuration process. The task implicitly fills gap in its configuration thus relieving the user from doing it manually.

The present invention can be implemented for different applications by using a so called inference engine. An inference engine must support reasoning over formal ontologies and facts represented in frame logic. First the formal ontologies representing the network elements and configuration tasks are loaded into the inference engine. Then application logic uses the query-answer interface of the engine to provide suggestions of configuration values to the user and run-time checking of the input configuration with the formal ontologies.

Figure 7:
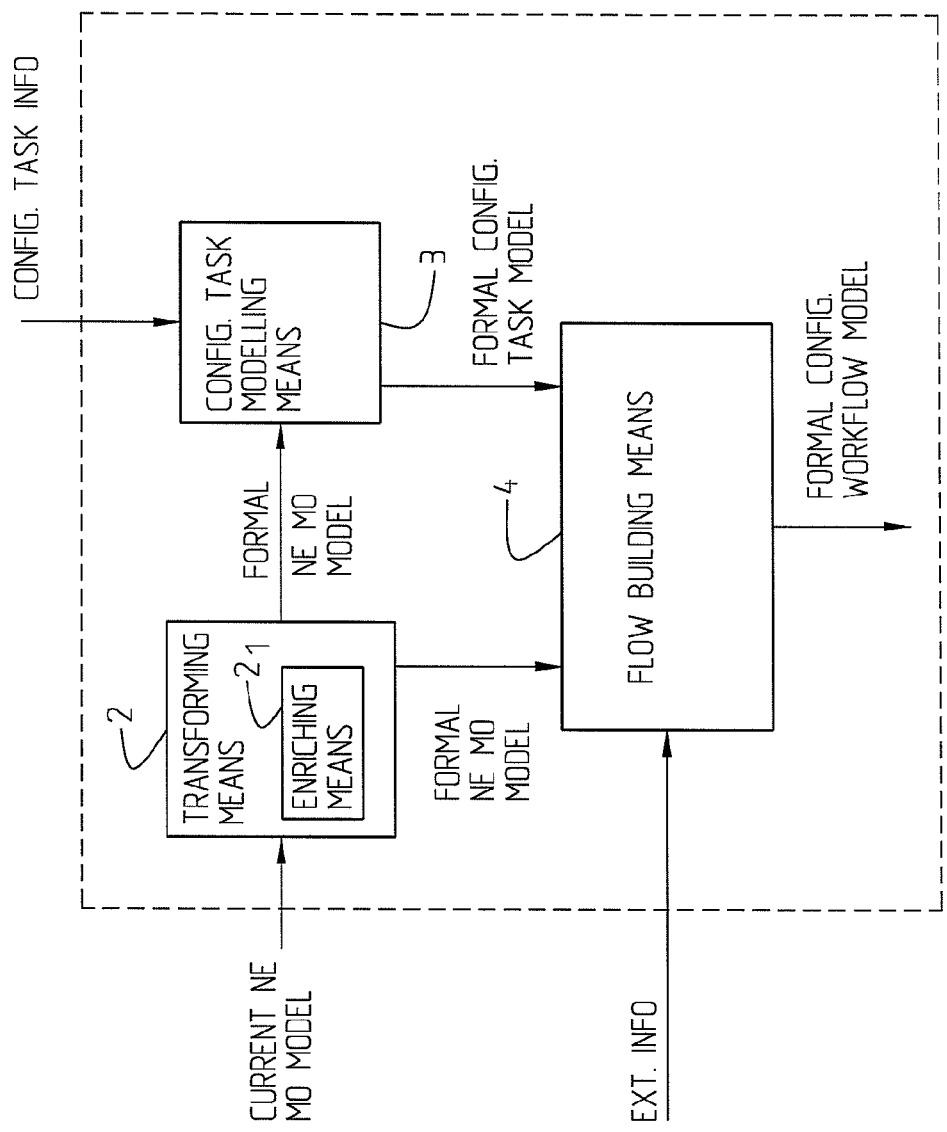
FIG. 7 shows a simplified block diagram of a system according to the invention.

FIG. 7 is a simplified block diagram of a system according to the present invention. The system comprises transforming means 2 for converting e.g. a MOM information model to an equivalent ontology model the transforming means 2 comprising, enriching means 21 or being capable of fulfilling the functionality of enriching the model e.g. by adding additional model constraints from current MOM specifications to the ontology based model. As an example a RAN NE MO model is transformed to an executable formal RAN NE MO model. It also comprises, conceptually or factually, identifying means (nor shown since it may simple relate to collect or establish which are the relevant tasks, for collection of configuration tasks, requirements, contracts between tasks from available specifications etc. In configuration task modelling means 3 this task related information is used for modelling different configuration tasks as formal descriptions with their properties, relationships with other tasks using an ontology language. It also comprises workflow building means 4 which, using the configuration task model and the formal NE MO model, and external information are adapted to put the different tasks together in workflows depending on the requirements for the specific control protocols.

Figure 8:
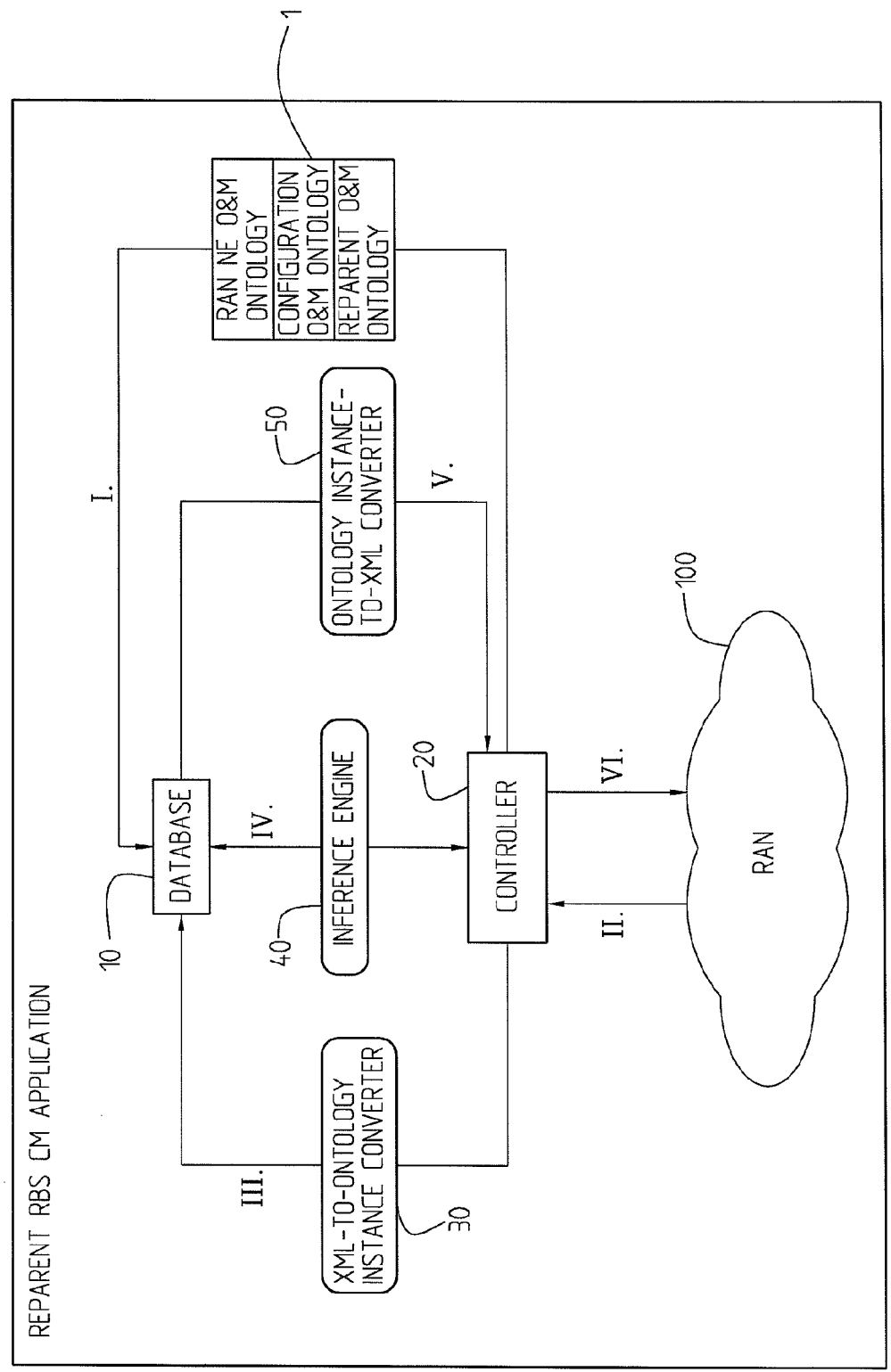
FIG. 8 illustrates an application scenario in form of a block diagram relating to prepareting of radio base stations in a radio network.

FIG. 8 shows a particular application scenario relating to radio base station (RBS) preparenting. It particularly describes how the method for semi-automatic configuration of control protocols according to the inventive concept can be implemented for radio base station preparenting by using the Bulk CM XML network interface. The implementation is generic to any other use case scenario as well.

In a first step I, a controller 20 loads the RAN NE MO formal model ontology, here an operation and maintenance model, and the formal configuration task model ontology and the preparent operation and maintenance ontologies provided in a repository 1 into a database 10. Subsequently the controller 20 requests the Bulk CM XML representation of the radio network data from the radio network RAN, which then is provided to it, II. The Bulk XML data is thereupon converted by an XML-to-ontology instance converter 30 ensuring that the network data is correctly extracted from the XML file according to the ontologies loaded in the database in step I, and used to populate the application database 10, III. Subsequently the controller 20 connects to the database 10 via the inference engine API (Application Programming Interface) 40 and is ready to be used by the user, IV. The user interaction with the controller 20 is usually achieved by a graphical user interface so that the user can perform the preparent RBS configuration task. When the configuration task has been completed, all tasks configured, the delta of the configuration represented in ontology instances in the database 10 is in converting means 50, comprising an ontology instances-to-XML converter, converted back to XML according to the Bulk CM XML standards, V, and provided to the controller 20. The controller 20 then pushes the new Bulk CM XML file into the network, VI.

Figure 9:
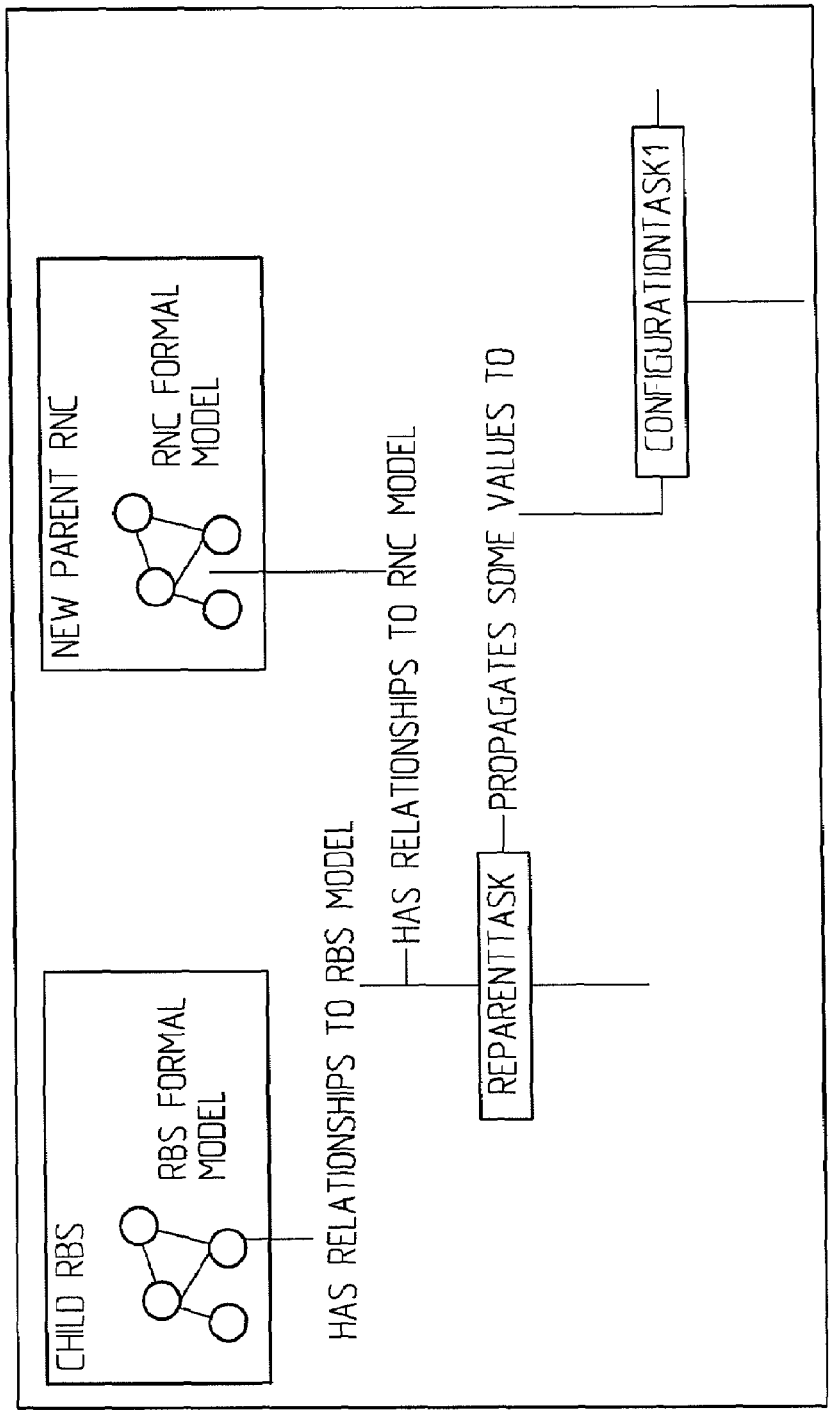
FIG. 9 is a more detailed illustration of step IV of FIG. 8.

FIG. 9 schematically illustrates an extension of step IV of FIG. 8, where the database was previously loaded with the Reparent RBS configuration task related formal network element managed object models, formal configuration task models and formal configuration workflows models. Then the user can use these models to perform RBS preparenting by interacting with the controller. In the case of RBS preparenting, for simplicity there are considered to be two actors, the child RBS and the new parent RNC. A preparent RBS configuration task consists in changing the parent of a child RBS which means accomplishing different configuration tasks as shown in FIG. 9. FIG. 9 schematically shows configuration tasks, relations between them and relations with the RNC and RBS formal models. The RBS formal model is basically the formal RAN NE O&M model for the radio base station, the RNC formal model is the RAN NE operation and maintenance formal model for the radio network controller and the configuration task 1 and the preparent task are part of the formal configuration task model. FIG. 9 thus shows part of a simple example of a formal configuration workflow model for the application preparent. The model needs to be loaded and instantiated in the database and therefore, in first step the user queries the preparent formal configuration workflow model which are the tasks to be completed. The tasks are displayed to the user. In the subsequent step the user selects any task he wants and asks the task to provide possible values for the properties the task is responsible for. Since the task has formal relationships with the RBS formal model, the RNC formal model and the other configuration task forming part of the preparent operation it relates to, it is able to collect data available in the database from these models as well as already configured tasks and display them to the user. The values displayed will always be consistent with the model, which means that the user does not have to check them for consistency, which is very advantageous. In a subsequent step, the user is able to modify the values suggested by the task, but the task will always check them with the constraints in the formal configuration workflow model for preparenting. Finally, when all tasks have been completed, the user can export the configuration, step V in FIG. 8. It should be clear that this relates to one particular implementation concerned with preparenting. The inventive concept is of course also applicable to other tasks as discussed above.

It is an advantage of the present invention that, from a software development point of view, a method and its possible implementations allows building of more robust configuration applications while reducing the development costs and favouring reuse and sharing of the formal models base in a portfolio of value-added configuration applications. This portfolio will have a common platform based on rich formal domain configuration models.

From the operators' perspective, the method would speed up the configuration or a reconfiguration process by providing meaningful suggestions to human operators and run-time validation of the decisions to prevent errors and mis-configuration. It will also relieve the burden of looking into different configuration guides etc. to assemble knowledge to perform configuration or reconfiguration. The formal models for configuration management can be used to build other applications that need these formal models for other purposes as well, such as training, education etc.

It should be clear that the invention is not limited to the explicitly illustrated embodiments but that it can be varied in a number of ways within the scope of the appended claims.

The invention claimed is:

1. A method of network management including configuring control protocols between network elements in a network represented by a current static network element object model comprising managed objects having attributes and instances to represent network resources, the method comprising:
   transforming, in a transforming component, a current static network element object model to a machine readable and executable formal network element object model by:
      forming a formal ontology to represent the current static network element object model by adding formal semantics and formal domain assumptions; and
      using frame logic to formally model managed object classes, attributes and relationships;
   identifying, in an identifying component, configuration tasks needed to configure relevant control protocols;
   modeling, in a modeling component, a formal configuration task model using information about the configuration tasks and the formal network element object model by:
      forming a formal ontology to represent the formal configuration task model;
      creating formal configuration ontologies for different configuration tasks needed to configure one or more of the relevant control protocols using frame logic; and
      building, in a workflow building component, a formal configuration workflow model using the formal network element object model and the formal configuration task model by providing respective workflows using frame logic primitives, wherein the formal configuration workflow model defines relationships between the different configuration tasks required for performing or completing one or more given actions, or to perform a selected action.

2. The method of claim 1 wherein transforming the current static network element object model further comprises creating conceptual or explicit meanings for the managed objects associated with the current static network element object model using frame logic primitives to represent managed object sub-classes, containments, and association relationships.

3. The method of claim 2 wherein the formal domain assumptions comprise domain constraints.

4. The method of claim 3 wherein the domain constraints comprise cardinality constraints.

5. The method of claim 3 further comprising:
   fetching the domain assumptions from specifications specifying the managed objects included in the current static network element managed object model; and
   adding the domain assumptions.

6. The method of claim 1 wherein the frame logic comprises F-logic, and wherein transforming the current static network element object model further comprises:
   mapping a Unified Modeling Language (UML) Managed Object Model to F-logic; and
   modeling constraints using F-logic rules.

7. The method of claim 1 wherein modeling the formal configuration task model further comprises ontologically establishing relationships between the protocol configuration tasks and the formal representation of the managed objects associated with the formal network element managed object model.

8. The method of claim 7 wherein a configuration task comprises one or more sub-tasks, and further comprising ontologically representing the configuration task and the sub-tasks.

9. The method of claim 1 wherein the configuration tasks comprise one or more of adding a network element, replacing a network element, removing a network element, preparenting a network element, reconfiguration of a network element, and performing a configuration task on part of a network element.

10. The method of claim 1 further comprising manually or automatically providing external information to the formal configuration workflow model.

11. The method of claim 1 wherein the workflow model is configured to:
   order the configuration task and/or sub-tasks to perform one or more different configuration task actions;
   provide relevant data to respective configuration tasks; and
   propagate relevant data between configuration tasks and sub-tasks.

12. The method of claim 1 further comprising inputting actual data from the network to assist in providing relationships between configuration tasks and/or sub-tasks.

13. The method of claim 1 further comprising using frame logic axioms to build configuration workflows.

14. The method of claim 1 further comprising executing the formal configuration workflows with data associated with network elements to obtain a semi-automatic configuration of the control protocols.

15. The method of claim 14 wherein executing the formal configuration workflows comprises using an inference engine to execute relevant workflows.

16. The method of claim 15 further comprising performing a configuration task by:
   loading the formal network element managed object model, the formal configuration task model, and a relevant configuration workflow ontology stored in an ontology repository for a given configuration task comprising one or more configuration tasks and/or one or more sub-tasks into a database;

requesting a representation of network data from the network to be configured;

converting the representation of network data to ontology instances;

providing a connection to the database via an inference engine Application Programming Interface (API) to provide a user interface;

automatically performing the configuration task via the user interface;

converting the resulting configuration ontology instances to configured network data; and introducing the configured network data into the network to obtain a configured or reconfigured network or network element.

17. The method of claim 16 wherein the representation of network data comprises an eXtensible Markup Language (XML) representation of network data.

18. The method of claim 16 wherein the XML representation of network data comprises a Bulk Configuration Management (CM) XML representation.

19. The method of claim 1 wherein the network comprises a Radio Access Network (RAN).

20. The method of claim 19 wherein the RAN comprises one of a Third Generation RAN (3G RAN), a Wideband Code Division Multiple Access RAN (WCDMA RAN), a Universal Mobile Telecommunications System Terrestrial RAN (UTRAN), a Global System for Mobile Enhanced Data rates for GSM Evolution RAN (GERAN), and a Code Division Multiple Access 2000 RAN (CDMA 2000 RAN).

21. The method of claim 1 wherein the current network element managed object model comprises an Operation and Maintenance model.

22. A network management system for configuring network element control protocols between network elements in a network represented by a current static network element managed object model comprising one or more managed objects having attributes and instances to represent network resources, the system comprising:

a transformer component configured to transform a current static network element managed object model to a machine readable and executable formal network element managed object model;

an enriching component communicatively connected to the transformer component, and configured to add formal semantics and formal domain assumptions to the formal network element managed object model;

an identifying component configured to identify configuration tasks needed to configure one or more control protocols;

a modeling component configured to model a formal configuration task model using information in the formal network element managed object model and information about the configuration tasks;

a workflow building component configured to build a formal configuration workflow model using the formal network element managed object model, the formal configuration task model, and external information, wherein the formal workflow configuration model defines relationships between different configuration tasks needed to perform or complete one or more actions comprising one or more configuration tasks; and wherein the transforming component and the modeling component comprise an ontogical forming component configured to:

form ontologies representing the current network managed object model and the configuration task model; and generate the formal network element managed object model and the formal configuration task model based on the formed ontologies, respectively.

23. The system of claim 22 wherein the enriching component is configured to create conceptual or explicit meanings for the managed objects of the current static network element object model using frame logic primitives to represent managed object sub-classes, containments, and association relationships.

24. The system of claim 23 wherein the workflow building component is configured to collect dedicated or external knowledge to provide workflows, and wherein the generated formal configuration workflows are configured to automatically collect data required for configuration workflows and to distribute data to configuration tasks.

25. The system of claim 22 wherein each of the transforming component, the modeling component, and the workflow building component are communicatively connected to an ontology repository that stores the formal models, and wherein the system further comprises:

an application database;

a network data to ontology instance converting component;

an ontology instance to network data converting component; and a controller connected to a user interface, and configured to request the network data and provide a connection to the application database via an interface engine.

* * * * *

UNITED STATES PATENT AND TRADEMARK OFFICE
CERTIFICATE OF CORRECTION

PATENT NO. : 7,953,580 B2  
APPLICATION NO. : 12/096265  
DATED : May 31, 2011  
INVENTOR(S) : Cleary et al.

Page 1 of 2

Figure 4:
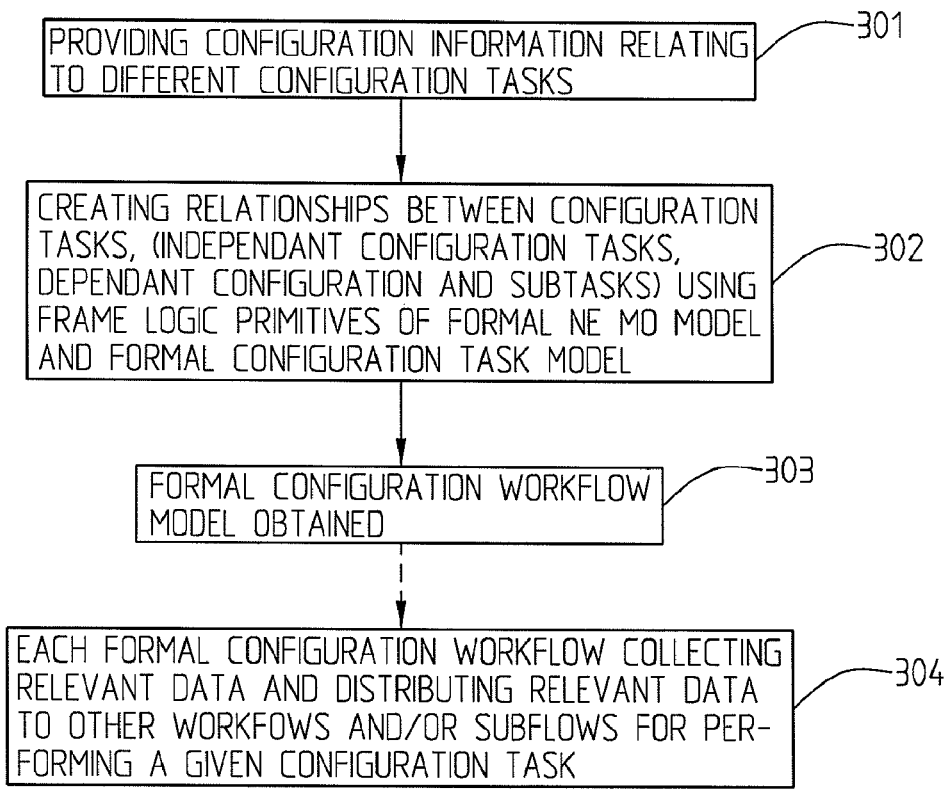

It is certified that error appears in the above-identified patent and that said Letters Patent is hereby corrected as shown below:

In Fig. 4, Sheet 2 of 6, for Tag "304", in Line 3, delete "WORKFOWS" and insert -- WORKFLOWS --, therefor.

In Fig. 7, Sheet 4 of 6, delete Tag "$2_1$" and insert Tag -- 21 --, therefor.

In Column 3, Line 22, delete "of;" and insert -- of: --, therefor.

In Column 4, Line 24, delete "preparenting" and insert -- reparenting --, therefor.

In Column 6, Line 10, delete "(IPR):" and insert -- (IRP): --, therefor.

In Column 6, Line 41, delete "preparenting" and insert -- reparenting --, therefor.

In Column 10, in "Table 2", Line 10, delete "Qos=" and insert -- QoS= --, therefor.

In Column 10, in "Table 2", Line 12, delete "Qos=" and insert -- QoS= --, therefor.

In Column 14, Line 7, delete "preparenting." and insert -- reparenting. --, therefor.

In Column 14, Line 10, delete "preparenting." and insert -- reparenting. --, therefor.

In Column 14, Line 16, delete "preparent" and insert -- reparent --, therefor.

In Column 14, Line 29, delete "preparent" and insert -- reparent --, therefor.

In Column 14, Line 43, delete "preparenting" and insert -- reparenting --, therefor.

In Column 14, Line 44, delete "preparenting," and insert -- reparenting, --, therefor.

Signed and Sealed this  
Eleventh Day of October, 2011

David J. Kappos  
*Director of the United States Patent and Trademark Office*

CERTIFICATE OF CORRECTION (continued)
U.S. Pat. No. 7,953,580 B2

In Column 14, Line 46, delete "preparent" and insert -- reparent --, therefor.

In Column 14, Line 55, delete "preparent" and insert -- reparent --, therefor.

In Column 14, Line 58, delete "preparent." and insert -- reparent. --, therefor.

In Column 16, Lines 38-39, in Claim 9, delete "preparenting" and insert -- reparenting --, therefor.

In Column 14, Line 60, delete "preparent" and insert -- reparent --, therefor.

In Column 14, Line 67, delete "preparent" and insert -- reparent --, therefor.

In Column 15, Line 8, delete "preparenting." and insert -- reparenting. --, therefor.

In Column 15, Lines 11-12, delete "preparenting." and insert -- reparenting. --, therefor.